United States Patent
Hsieh et al.

(10) Patent No.: US 9,558,543 B2
(45) Date of Patent: Jan. 31, 2017

(54) IMAGE FUSION METHOD AND IMAGE PROCESSING APPARATUS

(71) Applicants: TATUNG UNIVERSITY, Taipei (TW); Tatung Company, Taipei (TW)

(72) Inventors: Chen-Chiung Hsieh, Taipei (TW); Wen-Hao Wu, Taipei (TW)

(73) Assignees: TATUNG UNIVERSITY, Taipei (TW); Tatung Company, Taipei (TW)

( * ) Notice: Subject to any disclaimer, the term of this patent is extended or adjusted under 35 U.S.C. 154(b) by 0 days.

(21) Appl. No.: 14/818,295

(22) Filed: Aug. 4, 2015

(65) Prior Publication Data

US 2016/0300337 A1  Oct. 13, 2016

(30) Foreign Application Priority Data

Apr. 8, 2015 (TW) .............................. 104111231 A

(51) Int. Cl.
*G06K 9/00* (2006.01)
*G06T 5/50* (2006.01)
(Continued)

(52) U.S. Cl.
CPC ............... *G06T 5/50* (2013.01); *G06K 9/6202* (2013.01); *G06T 7/408* (2013.01); *G06T 11/60* (2013.01);
(Continued)

(58) Field of Classification Search
CPC .......... G06K 9/00; G06K 9/32; G06K 9/4652; G06K 9/6202; G06K 9/68; G06K 2009/2045; G06K 9/00234; G06K 9/6288; G06K 9/74; G06T 3/4038; G06T 5/002; G06T 5/003; G06T 5/008; G06T 5/009; G06T 5/50; G06T 7/0026; G06T 11/60; G06T 2207/10024; G06T 2207/10144;G06T 2207/10152; G06T 2207/20016; G06T 2207/20021; G06T 2207/20208; G06T 2207/20216; G06T 2207/20211; G06T 7/408; G06T 2207/10016; G06T 2207/20221; H04N 5/23258; H04N 5/2351; H04N 5/2352; H04N 5/2355; H04N 19/23; H04N 19/597

See application file for complete search history.

(56) References Cited

U.S. PATENT DOCUMENTS 8,588,551 B2 * 11/2013 Joshi ....................... G06T 5/003
382/260
8,699,821 B2 * 4/2014 Orr, IV ..................... G06T 5/50
382/294

(Continued)

FOREIGN PATENT DOCUMENTS

TW           201432616           8/2014

OTHER PUBLICATIONS

Li et al, "Multifocus color image fusion on feature level," International Conference on Computer Application and System Modeling (ICCASM), Oct. 22-24, 2010, pp. V1-541-V1-544.

(Continued)

Primary Examiner — Jose Couso
(74) Attorney, Agent, or Firm — Jianq Chyun IP Office

(57) ABSTRACT

An image fusion method and an image processing apparatus are provided. A first image is generated based on a first photographing parameter, and a second image is generated based on a second photographing parameter. A first pixel reference value of each of first pixels is calculated by using a self-define mask according to color components and a luminance component of the first pixels on the first image. A second pixel reference value of each of second pixels is calculated by using the self-define mask according to color components and a luminance component of the second (Continued)

pixels on the second image. A synthesizing reference map recording a plurality of synthesizing weights is obtained by comparing the first pixel reference value and the corresponding second pixel reference value. A fusion image is obtained by synthesizing the first image and the second image according to the synthesizing reference map.

22 Claims, 6 Drawing Sheets

(51) Int. Cl.
     *G06K 9/62*      (2006.01)
     *G06T 11/60*     (2006.01)
     *G06T 7/40*      (2006.01)

(52) U.S. Cl.
     CPC ............... *G06T 2207/10016* (2013.01); *G06T 2207/10024* (2013.01); *G06T 2207/20221* (2013.01)

(56) References Cited

U.S. PATENT DOCUMENTS

| | | | | |
|---|---|---|---|---|
| 8,760,537 B2* | 6/2014 | Johnson | ................... | G06T 5/50 348/222.1 |
| 8,861,868 B2* | 10/2014 | Shechtman | ............. | G06T 11/60 382/218 |
| 8,885,978 B2* | 11/2014 | Cote | ........................ | G06T 5/50 348/335 |

OTHER PUBLICATIONS

Singh et al, "Weighted Least Squares Based Detail Enhanced Exposure Fusion," ISRN Signal Processing, Feb. 2014, pp. 1-19.
"Office Action of Taiwan Counterpart Application", issued on Dec. 10, 2015, p. 1-p. 13.

* cited by examiner

IMAGE FUSION METHOD AND IMAGE PROCESSING APPARATUS

CROSS-REFERENCE TO RELATED APPLICATION

This application claims the priority benefit of Taiwan application serial no. 104111231, filed on Apr. 8, 2015. The entirety of the above-mentioned patent application is hereby incorporated by reference herein and made a part of this specification.

BACKGROUND OF THE INVENTION

Field of the Invention

The invention relates to an image processing method, more particularly, to an image fusion method and an image processing apparatus.

Description of Related Art

With advancements in the optical projection technology, cameras having adjustable aperture, shutter or even replaceable lenses are gradually popularized, and functionalities of the cameras are also more diverse. In conventional optical systems, because multiple objects in a three-dimensional scene have different distances, a full resolution image cannot be obtained during the capturing process of one single shot. That is to say, under the restriction by optical characteristics of the lens, only one of depths can be selected while the digital camera is capturing images, and thus the objects with the other depths may be relatively more blurred in the image formation.

However, in the conventional method for generating the full resolution image, a color image file is usually converted into a gray scale file before performing analysis and fusion thereto. Because this kind of image fusion method often ignores information contained in color component, it is possible that the full resolution image being fused may not be as good as expected, or shows in poor quality. Further, in most of the current image fusion methods, because the fusion is performed in a manner of dividing the image into multiple blocks, not only is such image division difficult to implement but also likely to cause loss in detail parts for the image with complex picture composition. Furthermore, an amount of calculations for generating the full resolution image is also one of the major subjects to be concerned for person skilled in the art.

SUMMARY OF THE INVENTION

Accordingly, the invention is directed to an image fusion method and an image processing apparatus, which are capable of generating the full resolution image by capturing images with different photographing conditions, and effectively improving a quality of the full resolution image while reducing the amount of calculations.

The invention provides an image fusion method, which is suitable for an image processing apparatus and includes the following steps. A first image and a second image associated with the same scene are obtained. The first image is generated based on a first photographing parameter, and the second image is generated based on a second photographing parameter. A first pixel reference value of each of first pixels is calculated by using a self-define mask according to color components and a luminance component of each of the first pixels on the first image. A second pixel reference value of each of second pixels is calculated by using the self-define mask according to color components and a luminance component of each of the second pixels on the second image. The first pixel reference value of each of the first pixels and the second pixel reference value of each of the corresponding second pixels are compared to obtain a plurality of synthesizing weights respectively associated with a plurality of pixel positions, and the synthesizing weights respectively associated with the pixel positions are recorded into a synthesizing reference map. A fusion image is obtained by synthesizing the first image and the second image according to the synthesizing reference map, the first pixels and the second pixels.

From another aspect, the invention further provides an image processing apparatus, which includes a storage unit and a processing unit. The storage unit records a plurality of modules, and the processing unit is coupled to the storage unit. The processing unit accesses and executes the modules recorded in the storage unit, and the modules includes an image obtaining module, a reference value generation module, a synthesizing reference map generation module and an image synthesizing module. The image obtaining module obtains a first image and a second image associated with the same scene. The first image is generated based on a first photographing parameter, and the second image is generated based on a second photographing parameter. The reference value generation module calculates a first pixel reference value of each of a plurality of first pixels by using a self-define mask according to color components and a luminance component of each of the first pixels on the first image. The reference value generation module calculates a second pixel reference value of each of a plurality of second pixels by using the self-define mask according to color components and a luminance component of each of the second pixels on the second image. The synthesizing reference map generation module compares the first pixel reference value of each of the first pixels and the second pixel reference value of each of the corresponding second pixels to obtain a plurality of synthesizing weights respectively associated with a plurality of pixel positions, and records the synthesizing weights respectively associated with the pixel positions into a synthesizing reference map. The image synthesizing module obtains a fusion image by synthesizing the first image and the second image according to the synthesizing reference map, the first pixels and the second pixels.

Based on the above, the invention adopts the characteristic of different focuses resulting in different images to generate the fusion image of a full resolution scene by synthesizing the images of the same scene which are captured by using the different focuses. Furthermore, the invention adopts the synthesizing reference map generated according to a ratio of the color saturation to the luminance of the pixel point as a determination reference, so as to utilize two or more images to accurately synthesize the expected fusion image with the full resolution effect. In addition, by using the self-define mask of the invention in a star-light fashion, the amount of calculations may be reduced without affecting the accuracy of the fusion.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
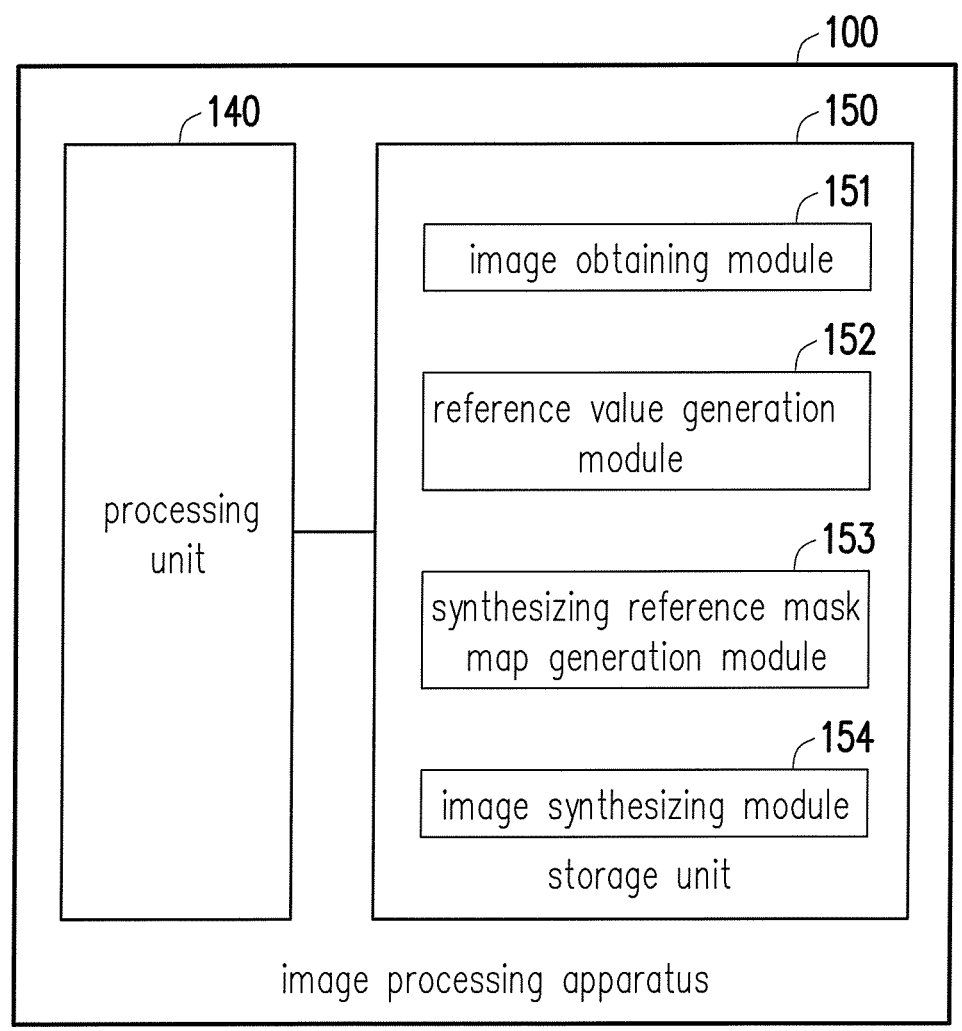
FIG. 1 is a block diagram illustrating an image processing apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In the present invention, the color saturation and the luminance of the pixels are used together to correctly estimate areas of two images which are clearer, so as to accurately synthesize the full resolution image with a more preferable visual effect. Further, in addition to reduction in the amount of calculations for image processing, the self-define mask of the invention may also be flexibly adjusted according to focuses of the two images. In order to make the content of the invention more comprehensible, embodiments are described below as the examples to prove that the invention can actually be realized.

FIG. 1 is a block diagram illustrating an image processing apparatus according to an embodiment of the invention. Referring to FIG. 1, an image processing apparatus 100 of the present embodiment is, for example, a desktop computer, a notebook computer, or other handheld electronic devices such as a smart phone, a tablet computer and so on, but the invention is not limited to the above. Further, in other embodiments, the image processing apparatus 100 may also be an image capturing apparatus including an image sensor, such as a digital camera or a digital camcorder. The image processing apparatus 100 includes a processing unit 140 and a storage unit 150.

The processing unit 140 may be, for example, a central processing unit (CPU), a microprocessor, an application specific integrated circuits (ASIC), a programmable logic device (PLD) or other hardware devices with computing capability. The storage unit 150 is, for example, a random access memory, a flash memory or other memories, and used to store data and a plurality of modules; whereas the processing unit 140 is coupled to the storage unit 150 and used to execute the modules. The modules include an image obtaining module 151, a reference value generation module 152, a synthesizing reference map generation module 153 and an image synthesizing module 154. The modules are, for example, computer programs that can be loaded into the processing unit 140 for executing image fusion functions.

Specifically, the image processing apparatus of the invention is capable of synthesizing for a fusion image according two or more images, wherein the fusion image is formed by a combination of the images captured with different photography conditions. Said images are synthesized into one full resolution image by changing one or more photographing parameters among the photography conditions followed by correctly estimating the areas which are clearer in each of the images by using the color saturation and the luminance. The photographing parameters are, for example, a focus value or an aperture value, which are not particularly limited in the invention.

Figure 2:
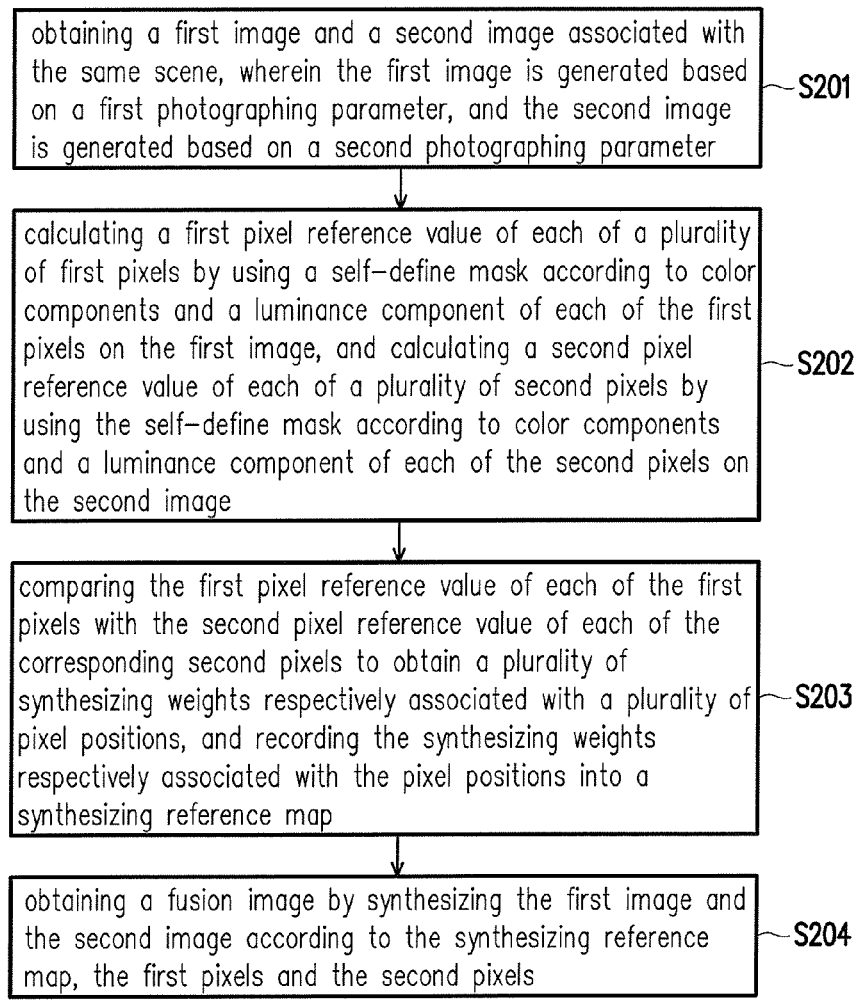
FIG. 2 is a flowchart illustrating an image processing method according an embodiment of the invention.

FIG. 2 is a flowchart illustrating an image fusion method according an embodiment of the invention. The method depicted in FIG. 2 is suitable for the image processing apparatus 100 of FIG. 1, and detailed steps of the image processing method of the present embodiment are provided below with reference to each component in the image processing apparatus 100.

Referring to FIG. 1 and FIG. 2, in step S201, the image obtaining module 151 obtains a first image and a second image associated with the same scene, wherein the first image is generated based on a first photographing parameter, and the second image is generated based on a second photographing parameter. For instance, the first photographing parameter is a first focus length, and the second photographing parameter is a second focus length. In other words, the first image is an image captured by using the first focus length, the second image is an image captured by using the second focus length, and the first focus length is different from the second focus length. In an embodiment, the first image may be an image captured by the image capturing apparatus which focuses on a person, and the second image is an image captured by the image capturing apparatus which focuses on a background of the same scene. Under the same conditions, the images captured by using different focuses have different results. Specifically, with respect to the first image focused on the person, the person in the image is the clearest.

In step S202, the reference value generation module 152 calculates a first pixel reference value of each of a plurality of first pixels by using a self-define mask according to color components and a luminance component of each of the first pixels on the first image Also, the reference value generation module 152 calculates a second pixel reference value of each of a plurality of second pixels by using the self-define mask according to color components and a luminance component of each of the second pixels on the second image. Further, the first image is composed of the first pixels, and the second image is composed of the second pixels. In the present embodiment, because the first image and the second image are captured by the same image capturing apparatus with similar photography conditions, a number of the first pixels is equal to a number of the second pixels.

Furthermore, the description below is provided by using, for example, pixel data of the first pixels and the second pixels established based on a YCbCr color space. Specifically, the pixel data of each of the first pixels includes the color components (Cb and Cr) and the luminance component (Y). More specifically, the luminance component (Y) indicates a luminance of one single pixel, a first color component (Cb) of the color components indicates a blue chrominance of one single pixel, and a second color component of the color components indicates a red chrominance of one single pixel. Similarly, the pixel data of each of the second pixels also includes the color components (Cb and Cr) and the luminance component (Y). However, the invention is not limited thereto. In another embodiment, the pixel data of the first pixels and the second pixels may be established based on a YUV color space.

Figure 3:
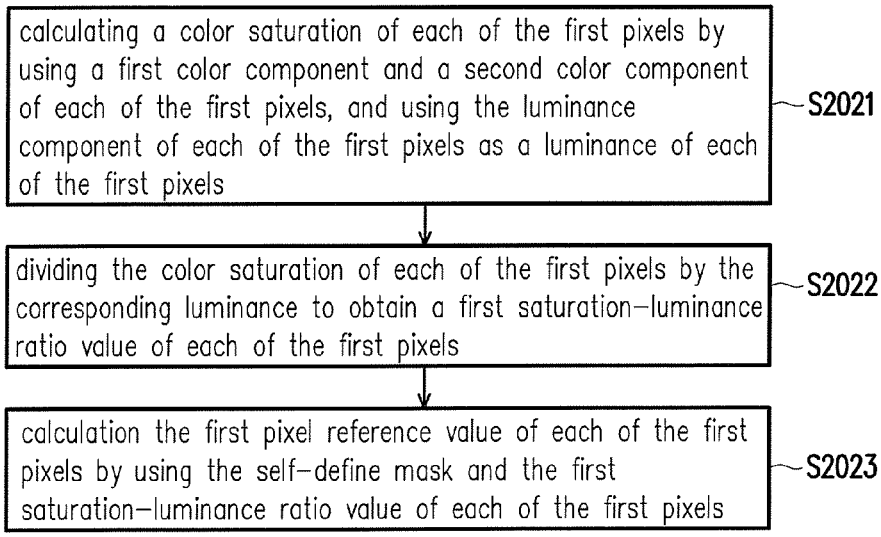
FIG. 3 illustrates a flowchart for generating the first pixel reference value according to an embodiment of the invention.

In comparison with the conventional method for generating the full resolution image by using the gray scale values, the reference value generation module 152 of the present embodiment generates the first pixel reference value and the second pixel reference value (which are configured to identify resolutions) according to the color components in the pixel data, so as to determine whether to use the first pixel or the second pixel as a pixel point on the fusion image by comparing the first pixel reference value and the second pixel reference value at the same pixel position. For explaining the invention more clearly, FIG. 3 illustrates a flowchart for generating the first pixel reference value according to an embodiment of the invention.

In step S2021, the reference value generation module 152 calculates a color saturation of each of the first pixels by using a first color component and a second color component of each of the first pixels, and uses the luminance component of each of the first pixels as a luminance of each of the first pixels. Further, for example, in a YCbCr color space, the reference value generation module 152 may calculate the color saturation of each of the first pixels according to Equation (1).

$$C = \frac{Cb + Cr}{2} \qquad \text{Equation (1)}$$

Herein, C in Equation (1) indicates the color saturation of the first pixel, Cb in Equation (1) indicates the first color component of the first pixel, and Cr in Equation (1) indicates the second color component of the first pixel. However, the invention is not limited thereto. The reference value generation module 152 may also calculate the color saturation of each of the first pixels according to Equation (2).

$$C = \sqrt{Cb^2 + Cr^2} \qquad \text{Equation (2)}$$

Herein, C in Equation (2) indicates the color saturation of the first pixel, Cb in Equation (2) indicates the first color component of the first pixel, and Cr in Equation (2) indicates the second color component of the first pixel.

In other words, the color saturation of each of the first pixels may also be generated based on the color components of each of the first pixels. For example, in the YCbCr color space, the reference value generation module 152 uses the luminance component (Y component) of each of the first pixels as the luminance of each of the first pixels. In other words, the luminance of each of the first pixels is the luminance component of each of the first pixels. Thereafter, in step S2022, the reference value generation module 152 divides the color saturation of each of the first pixels by the luminance to obtain a first saturation-luminance ratio value of each of the first pixels. Further, the reference value generation module 152 may also calculate the first saturation-luminance ratio value of each of the first pixels according to Equation (3).

$$CY\_ratio = \frac{C}{Y} \qquad \text{Equation (3)}$$

Herein, C in Equation (3) indicates the color saturation of the first pixel, Y in Equation (3) indicates the luminance of the first pixel, and CY_ratio in Equation (3) indicates the first saturation-luminance ratio value of the first pixel. In other words, each of the first pixels in the first image has the corresponding first saturation-luminance ratio value of its own.

In step S2023, the reference value generation module 152 calculates the first pixel reference value of each of the first pixels by using the self-define mask and the first saturation-luminance ratio value of each of the first pixels. In brief, based on a coverage range of the self-define mask, the reference value generation module 152 may be informed of a variation between each of the first pixels and its adjacent pixels, so as to calculate the first pixel reference value that is capable of representing a respective resolution.

Specifically, the reference value generation module 152 defines a target point among the first pixels and a plurality of reference points among the first pixels by using the self-define mask. It should be noted that, the target point is located at a center of the self-define mask, and the reference points are located on the self-define mask in a vertical direction, a horizontal direction and two diagonal directions. Accordingly, in comparison with the method of calculating each of pixel points within the mask, the amount of calculations may be reduced by using the self-define mask of the present embodiment. As a result, the reference value generation module 152 calculates differences between the first saturation-luminance ratio value of the target point and the first saturation-luminance ratio values of the reference points one by one, and sums absolute values of the differences to obtain the first pixel reference value of the target point.

Figure 4:
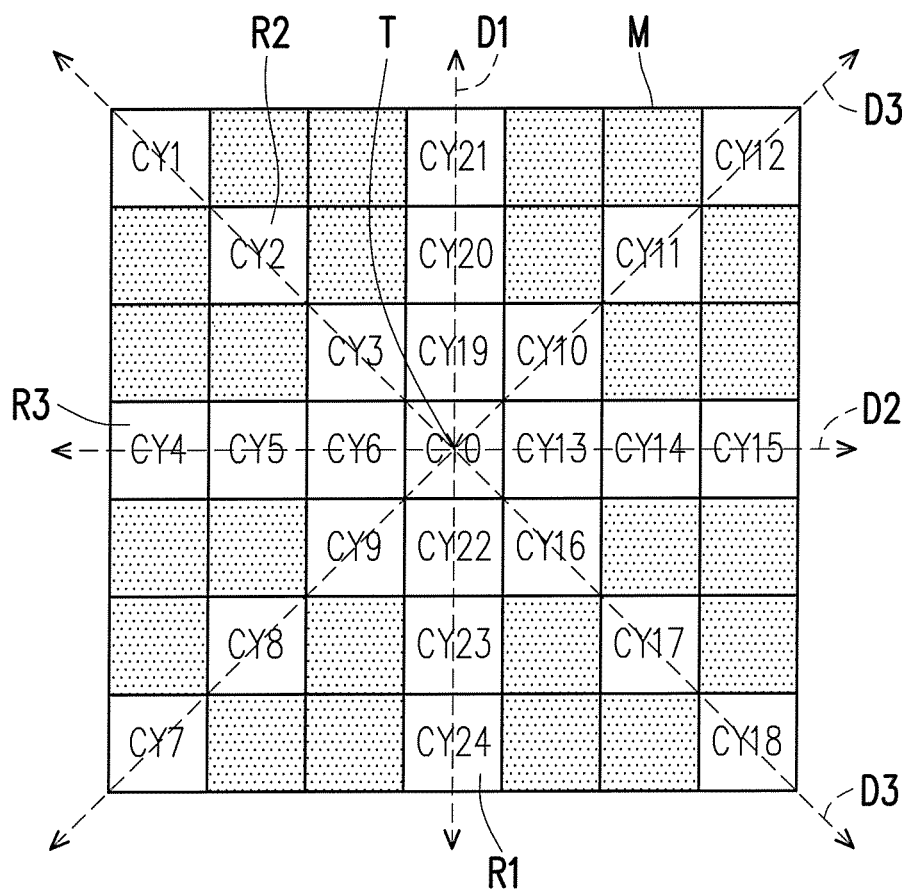
FIG. 4 is a schematic diagram illustrating an example of the self-define mask according to an embodiment of the invention.

FIG. 4 is a schematic diagram illustrating an example of the self-define mask according to an embodiment of the invention. As shown in FIG. 4, a size of a self-define mask M is 7*7, but the invention is not limited thereto. The reference value generation module 152 defines a target point among the first pixels and a plurality of reference points among the first pixels by using the self-define mask M. In the example of FIG. 4, a target point T is located at a center of the mask M, and a plurality of reference points are located on the self-define mask M in a vertical direction D1, a horizontal direction D2 and two diagonal directions D3. For instance, a reference point R1 is located on the self-define mask M in the vertical direction D1, a reference point R2 is located on the self-define mask M in the two diagonal directions D3, and a reference point R3 is located on the self-define mask M in the horizontal direction D2. Furthermore, after performing the calculations in step S2021 to S2022, the target point T and the reference points within the self-define mask M have corresponding first saturation-luminance ratio values CY0 to CY24, respectively. For example, the target point T has the corresponding first saturation-luminance ratio value CY0, and the reference point R1 has the corresponding first saturation-luminance ratio value CY24. The reference point R2 has the corresponding first saturation-luminance ratio value CY2, and the reference point R3 has the corresponding first saturation-luminance ratio value CY4.

Accordingly, the first pixel reference value of the target point T depicted in FIG. 4 may be calculated according to Equation (4).

$$C/Y = |CY1 - CY0| + |CY2 - CY0| + |CY3 - CY0| + \ldots + |CY23 - CY0| + |CY24 - CY0| \qquad \text{Equation (4)}$$

Herein, C/Y in Equation (4) indicates the first pixel reference value of the target point, CY0 in Equation (4) indicates the first saturation-luminance ratio value of the target point, and CY1 to CY24 in Equation (4) indicate the saturation-luminance ratio values of the reference points, respectively.

Accordingly, by moving the self-define mask, each of the pixel points on the first image may be used as the target point, and the first pixel reference value of each of the pixel points on the first image may also be obtained by reference with the above descriptions and equations.

It should be additionally noted that, although FIG. 3 is described by using the first pixels on the first image as example, the similar process and calculations may also be implemented on the second pixels on the second image. In other words, the second pixel reference value corresponding to each of the second pixels may also be obtained through the process depicted in FIG. 3 and the self-define mask depicted in FIG. 4. Specifically, the reference value generation module 152 calculates a color saturation of each of the second pixels by using a first color component and a second color component of each of the second pixels, and uses the luminance component of each of the second pixels as a luminance of each of the second pixels. Thereafter, the reference value generation module 152 divides the color saturation of each of the second pixels by the luminance to obtain a second saturation-luminance ratio value of each of the second pixels. Lastly, the reference value generation module 152 performs a calculation by using the self-define mask and the second saturation-luminance ratio value of each of the second pixels to obtain the second pixel reference value of each of the second pixels.

In this way, referring back to step S203 of FIG. 2, the synthesizing reference map generation module 153 may compare the first pixel reference value of each of the first pixels with the second pixel reference value of each of the corresponding second pixels to obtain a plurality of synthesizing weights respectively associated with a plurality of pixel positions, and record the synthesizing weights respectively associated with the pixel positions into a synthesizing reference map. Lastly, in step S204, the image synthesizing module 154 obtains a fusion image by synthesizing the first image and the second image according to the synthesizing reference map, the first pixels and the second pixels. Herein, with respect to one single pixel position, if the first pixel value is greater than the corresponding second pixel value, it indicates that a resolution of the first pixel is higher than a resolution of the second pixel. In contrast, with respect to one single pixel position, if the second pixel value is greater than the corresponding first pixel value, it indicates that the resolution of the second pixel is higher than the resolution of the first pixel. Accordingly, based on a comparison result of the first pixel reference value and the second pixel reference value, the image synthesizing module 154 may determine to use the first pixel or the second pixel as a pixel point on the fusion image.

It is worth mentioning that, in the embodiment where the first image and the second image are captured based on the first focus length and the second focus length, a size of the self-define mask may also be set according to a focus difference between the first focus length and the second focus length in the invention. In other words, in an embodiment, the storage unit 150 may further include a mask size setting module, and the mask size setting module can calculate the focus difference between the first focus length and the second focus length. The mask size setting module is capable of setting a size of the self-define mask according to the focus difference. The size of the self-define mask is larger if the focus difference is larger, and the size of the self-define mask is smaller if the focus difference is smaller. In other words, the size of the self-define mask becomes larger in response to increment of the focus difference, and the size of the self-define mask becomes smaller in response to decrement of the focus difference. Specifically, a relationship between the focus difference and the size of the self-define mask may be predetermined to be a linear relationship. Therefore, the size of the self-define mask may be determined through a calculation of a linear equation. However, the mask size setting module may also determine the size of the self-define mask based on the focus difference recorded in a lookup table, which is not particularly limited in the invention. For instance, each time when the focus difference is increased by 50 meters, a length and a width of the self-define mask may both be increased by two pixel units.

However, implementation of the invention is not limited to the above, and the content of the foregoing embodiment may be changed based on actual demands. For example, in an embodiment of the invention, the storage unit of the image capturing apparatus may further include an offset calibration module and a data format conversion module, so as to produce the fusion image with the full resolution scene by using the images corresponding to the different photographing parameters. In addition, in an embodiment of the invention, whether a difference between the first pixel reference value and the second pixel reference value is close enough may be further determined, so as to determine whether to use an average value of the first pixel and the second pixel as the pixel point on the fusion image. Another embodiment is given for illustration below.

Figure 5:
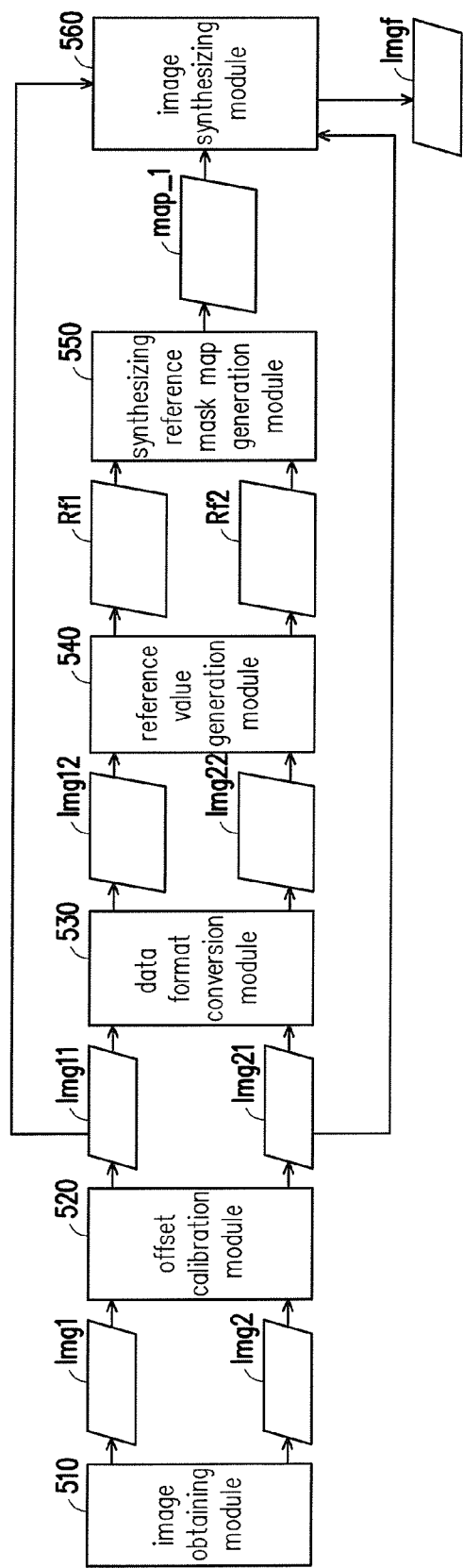
FIG. 5 is a schematic diagram illustrating operations of an image compensation method according to an embodiment of the invention.

FIG. 5 is a schematic diagram illustrating operations of an image compensation method according to an embodiment of the invention. An image obtaining module 510, a reference value generation module 540, a synthesizing reference map generation module 550 and an image synthesizing module 560 are identical or similar to the image obtaining module 151, the reference value generation module 152, the synthesizing reference map generation module 153 and the image synthesizing module 154 in FIG. 1, and details thereof may refer to the foregoing descriptions.

First of all, the image obtaining module 510 obtains a first image Img1 and a second image Img2 associated with the same scene, wherein the first image Img1 is generated based on a first photographing parameter, and the second image Img2 is generated based on a second photographing parameter. In brief, the first image Img1 and the second image Img2 may be images captured from the same scene based on different focuses or different aperture values.

Next, the offset calibration module 520 performs a geometry calibration procedure on the first image Img1 or the second image Img2 to generate an offset-calibrated first image Img11 or an offset-calibrated second image Img21. Because the first image Img1 and the second image Img2 are captured from the same scene in sequence, based on oscillation or movement of the camera during the capturing period, the images may be captured to include different angles, (i.e., an offset may occur on the first image or the second image). Therefore, the offset calibration module 520 may perform the geometry calibration procedure on the first image Img1 or the second image Img2. In other words, the geometry calibration procedure may allow the first pixel and the second pixel at the same position in the scene to include the same pixel point for the same position. For instance, the offset calibration module 520 may perform an estimation for an amount of the movement on the first image Img1 and the second image Img2, so as to calculate the amount of movement between the first image Img1 and the second image Img2 and thereby perform a movement compensation on the first image Img1 or the second image Img2.

Thereafter, the data format conversion module 530 performs a data format conversion procedure on the offset-calibrated first image Img11 and the offset-calibrated second image Img21 to convert the offset-calibrated first image Img11 and the offset-calibrated second image Img21 that belong to an original data format into a first YCbCr image Img12 and a second YCbCr image Img22 that belong to a YCbCr format. For instance, the original data format may be a RGB color space, and the data format conversion module 530 may convert the first image Img11 and the second image Img21 that belong to the RGB color space into the first YCbCr image Img12 and the second YCbCr image Img22 that belong to the YCbCr format. However, the invention is not limited thereto. In other embodiments of the present application, the original data format is not limited only to be the RGB color space format but can also be other color space formats, such as a CMYK color space.

As a result, the reference value generation module 540 calculates a first pixel reference value Rf1 of each of a plurality of first pixels by using a self-define mask according to color components and a luminance component of each of the first pixels on the first YCbCr image Img12. Also, the reference value generation module 152 calculates a second pixel reference value Rf2 of each of a plurality of second pixels by using the self-define mask according to color components and a luminance component of each of the second pixels on the second YCbCr image.

Thereafter, the synthesizing reference map generation module 550 may compare the first pixel reference value Rf1 of each of the first pixels and the second pixel reference value Rf2 of each of the corresponding second pixels to obtain a plurality of synthesizing weights respectively associated with a plurality of pixel positions, and record the synthesizing weights respectively associated with the pixel positions into a synthesizing reference map map_1. Lastly, the image synthesizing module 560 obtains a fusion image Imgf by synthesizing the first image Img11 and the second image Img21 according to the synthesizing reference map map_1, the first pixels and the second pixels.

In an embodiment, the synthesizing reference map map_1 records the comparison result of the first pixel reference value and the second pixel reference value on each of the pixel positions. In this way, the image synthesizing module 560 may determine whether the pixel point on the fusion image Imgf is to be the first pixel or the second pixel according to the synthesizing reference map map_1 so as to obtain the fusion image Imgf according to the first image Img11 and the second image Img21. More specifically, the synthesizing reference map generation module 550 determines whether the first pixel reference value of each of the first pixels is greater than the second pixel reference value of each of the corresponding second pixels. If the first pixel reference value is greater than the second pixel reference value at the same pixel position, the synthesizing reference map generation module 550 sets the corresponding synthesizing weight corresponding to the pixel positions where the first pixel reference value RF1 is greater than the second pixel reference value RF2 to be a first fetch-point index. Otherwise, if the first pixel reference value is not greater than the second pixel reference value at the same pixel position, the synthesizing reference map generation module 550 sets the corresponding synthesizing weight corresponding to the pixel positions where the first pixel reference value RF1 is not greater than the second pixel reference value RF2 to be a second fetch-point index.

The synthesizing reference map generation module 550 compares the first pixels and the corresponding second pixels one by one, so as to set the synthesizing weights corresponding to each of the pixel positions to be the first fetch-point index or the second fetch-point index. In other words, the synthesizing reference map map_1 records the synthesizing weights corresponding to each of the pixel positions, wherein the synthesizing weight is the first fetch-point index or the second fetch-point index.

As a result, during the process of the image synthesizing module 560 for generating the fusion image Imgf, if the synthesizing weight on the synthesizing reference map map_1 is the first fetch-point index, the image synthesizing module 560 fetches the first pixel corresponding to the first fetch-point index as the pixel point on the fusion image Imgf. On the other hand, if the synthesizing weight on the synthesizing reference map map_1 is the second fetch-point index, the image synthesizing module 560 fetches the second pixel corresponding to the second fetch-point index as the pixel point on the fusion image.

Figure 6A:
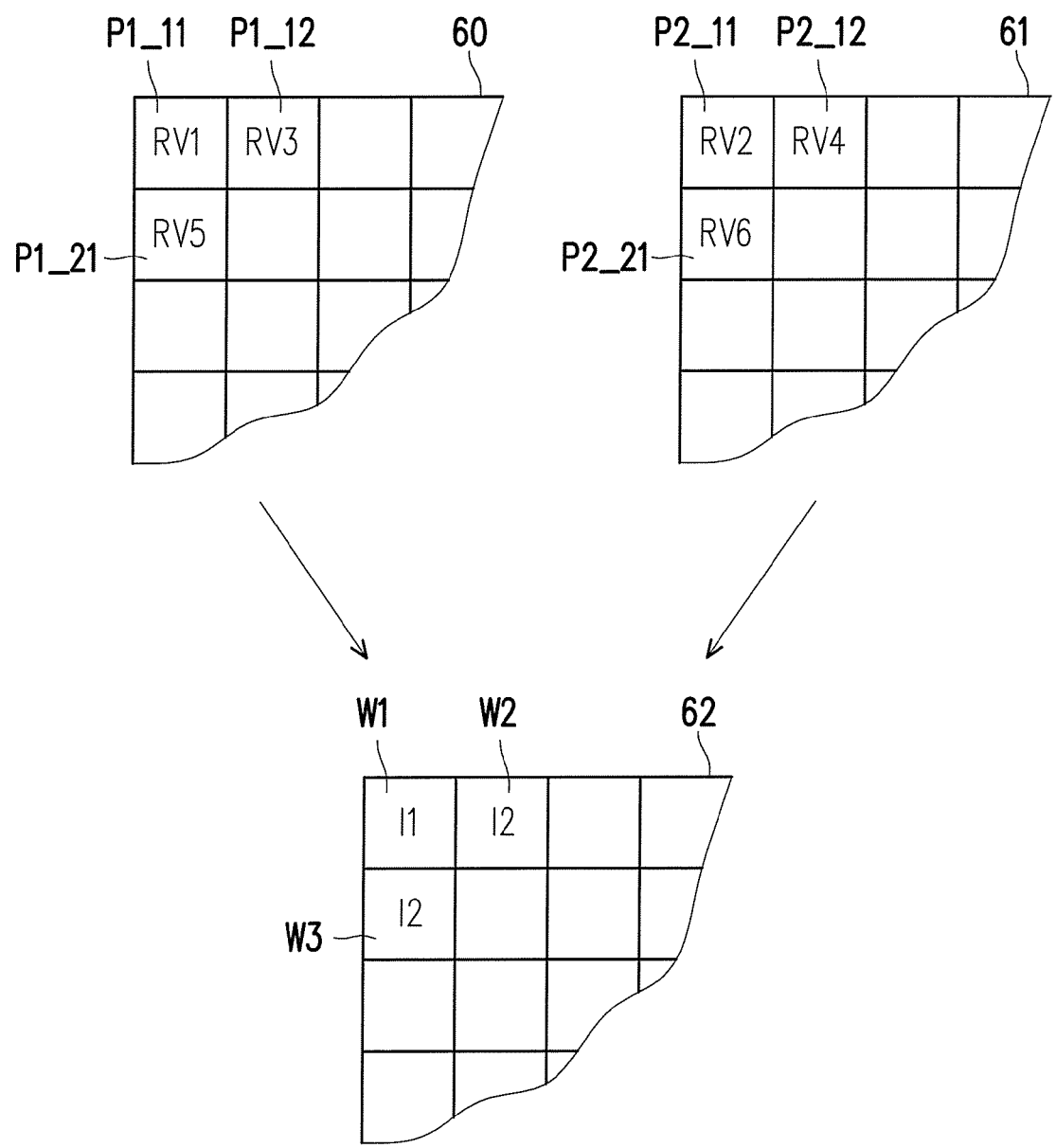
FIG. 6A is a schematic diagram illustrating an example for generating a synthesizing reference map according to an embodiment of the invention.

FIG. 6A is a schematic diagram illustrating an example for generating a synthesizing reference map according to an embodiment of the invention. Referring to FIG. 6A, an image portion 60 of the first image includes first pixels P1_11, P1_12 and P1_21. After being processed by the reference value generation module 540, the first pixel P1_11 has a corresponding first pixel reference value RVI, the first pixel P1_12 has a corresponding first pixel reference value RV3, and the first pixel P1_21 has a corresponding first pixel reference value RV5. Similarly, an image portion 61 of the second image includes second pixels P2_11, P2_12 and P2_21. After being processed by the reference value generation module 540, the second pixel P2_11 has a corresponding second pixel reference value RV2, the second pixel P2_12 has a corresponding second pixel reference value RV4, and the second pixel P2_21 has a corresponding second pixel reference value RV6.

The synthesizing reference map generation module 550 compares the first pixel reference value RV1 and the second pixel reference value RV2 corresponding to the same pixel position. In this example, it is assumed that the first pixel reference value RV1 is greater than the second pixel reference value RV2, and thus the synthesizing reference map generation module 550 sets a synthesizing weight W1 to be a first fetch-point index I1. Further, the synthesizing reference map generation module 550 compares the first pixel reference value RV3 and the second pixel reference value RV4 corresponding to the same pixel position. In this example, it is assumed that the second pixel reference value RV4 is greater than the first pixel reference value RV3, and thus the synthesizing reference map generation module 550 sets a synthesizing weight W2 to be a second fetch-point index I2.

Similarly, the synthesizing reference map generation module 550 may set a synthesizing weight W3 to be the second fetch-point index I2 by comparing the first pixel reference value RV5 and the second pixel reference value RV6. By recording the synthesizing weight on each of the pixel positions, the synthesizing reference map generation module 550 can generate the reference mask map map_1. The first fetch-point index I1 is different from the second fetch-point index I2. In an embodiment, the first fetch-point index I1 may be set to be 255 while the second fetch-point index I2 may be set to be 0, but the invention is not limited thereto. In addition, the image synthesizing module 560 may determine to use the first pixel P1_11, the second pixel P2_12 and the second pixel P2_21 as the pixel points on the fusion image Imgf according to a mask map portion 62 of the synthesizing reference map map_1.

However, it is worth mentioning that, in an embodiment, when the first pixel reference value and the second pixel reference value are very close, the synthesizing reference map generation module 550 may directly set the corresponding synthesizing weight to be one of the first fetch-point index I1 or the second fetch-point index I2. Alternatively, in an embodiment, when the first pixel reference value and the second pixel reference value are very close, the synthesizing reference map generation module 550 may also set the corresponding synthesizing weight to be an average value of the first fetch-point index I1 and the second fetch-point index I2.

More specifically, the synthesizing reference map generation module 550 determines whether a difference between the first pixel reference value of each of the first pixels and the second pixel reference value of each of the corresponding second pixel is less than a threshold. If the difference between the first pixel reference value and the second pixel reference value is less than the threshold, the synthesizing reference map generation module 550 sets the corresponding synthesizing weight to be a third fetch-point index. Accordingly, if the synthesizing weight on the synthesizing reference map map_1 is the third fetch-point index, the image synthesizing module 560 fetches an average value of the first pixel and the second pixel corresponding to the third fetch-point index as the pixel point on the fusion image Imgf.

Figure 6B:
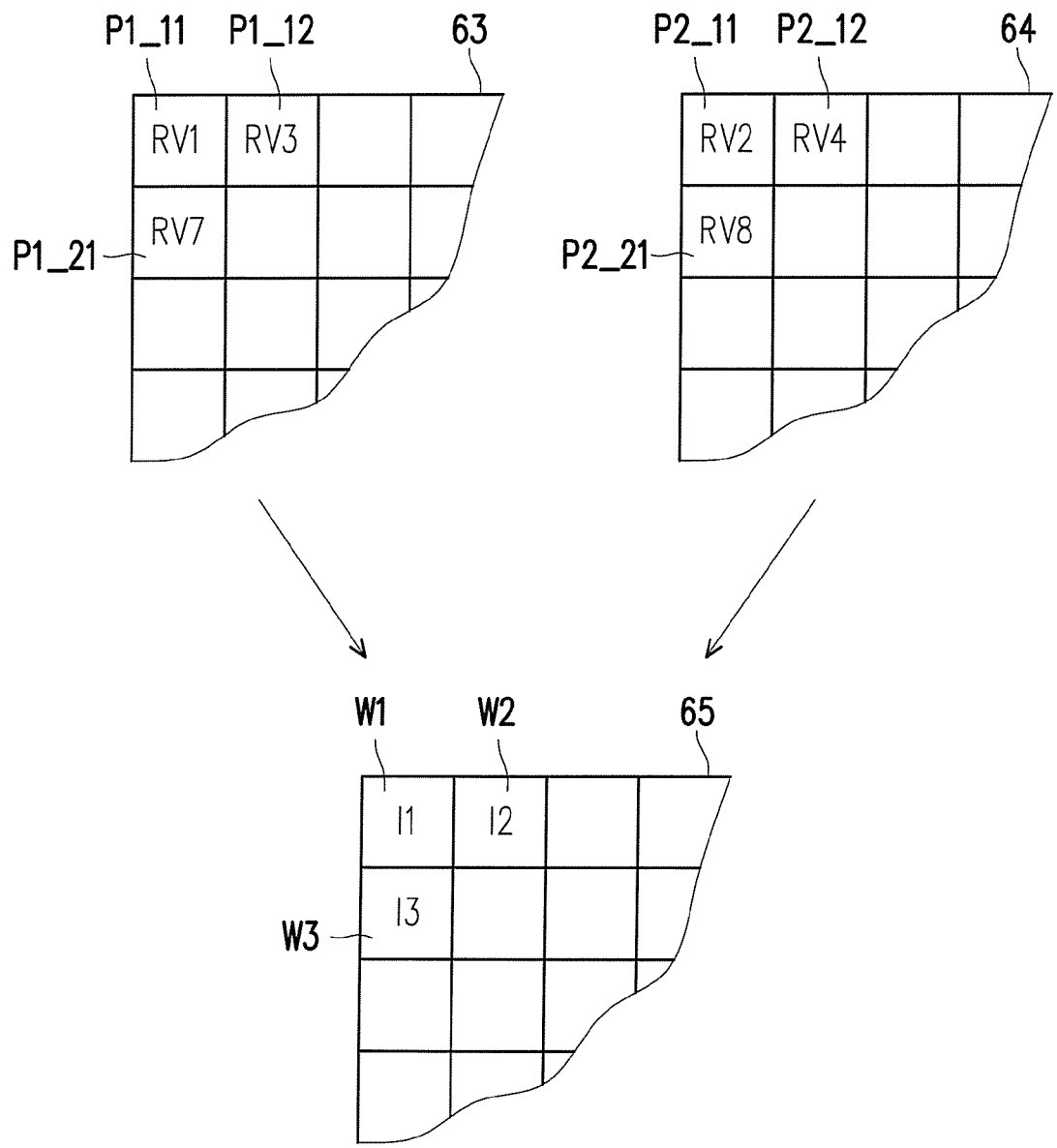
FIG. 6B is a schematic diagram illustrating an example for generating a synthesizing reference map according to an embodiment of the invention.

In FIG. 6B, for example, an image portion 63 of the first image and an image portion 64 of the second image are compared, wherein the first pixel reference value RV1 is greater than the second pixel reference value RV2. Therefore, the synthesizing reference map generation module 550 sets the synthesizing weight W1 to be the first fetch-point index I1, and the image synthesizing module 560 fetches the first pixel P1_11 as the pixel point on the fusion image Imgf according to the first fetch-point index I1. Because the first pixel reference value RV4 is greater than the second pixel reference value RV3, the synthesizing reference map generation module 550 sets the synthesizing weight W2 to be the second fetch-point index I2, and the image synthesizing module 560 fetches the first pixel P2_12 as the pixel point on the fusion image Imgf according to the second fetch-point index I2. Further, the synthesizing reference map generation module 550 compares a first pixel reference value RV7 and a second pixel reference value RV8 corresponding to the same pixel position. In this example, it is assumed the difference between the first pixel reference value RV7 and the second pixel reference value RV8 is less than the threshold, and thus the synthesizing reference map generation module 550 sets the synthesizing weight W3 to be a third fetch-point value I3. Therefore, the image synthesizing module 560 fetches the average value of the first pixel P1_21 and the second pixel P2_21 as the pixel point on the fusion image Imgf according to the third fetch-point index I3.

In summary, in the embodiments of the invention, the synthesizing reference map for synthesizing the images are calculated by using at least two images with the different focuses, and the full resolution image is synthesized according to the synthesizing reference map. Particularly, in addition to luminance information, the invention further uses color information in the pixel data as a reference for generating the synthesizing reference map. Accordingly, based on the image processing method of the invention, the fusion image with favorable and natural full resolution effect may be synthesized by using the multiple images captured based on the different photographing parameters. In addition, for the methods based on calculations for each pixel point, the invention is capable of preventing discontinuation on the edges and loss in detail. Furthermore, by using the self-define mask of the invention, the amount of calculations may be reduced without affecting the quality of the fusion image.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. An image fusion method, for an image processing apparatus, comprising:

obtaining a first image and a second image associated with the same scene, wherein the first image is generated based on a first photographing parameter, and the second image is generated based on a second photographing parameter;

calculating a first pixel reference value of each of a plurality of first pixels by using a self-define mask according to color components and a luminance component of each of the first pixels on the first image, and calculating a second pixel reference value of each of a plurality of second pixels by using the self-define mask according to color components and a luminance component of each of the second pixels on the second image;

comparing the first pixel reference value of each of the first pixels with the second pixel reference value of each of the corresponding second pixels to obtain a plurality of synthesizing weights respectively associated with a plurality of pixel positions, and recording the synthesizing weights respectively associated with the pixel positions into a synthesizing reference map; and obtaining a fusion image by synthesizing the first image and the second image according to the synthesizing reference map, the first pixels and the second pixels, wherein the step of calculating the first pixel reference value of each of the first pixels by using the self-define mask according to the color components and the luminance component of each of the first pixels on the first image comprises:

calculating a color saturation of each of the first pixels by using a first color component and a second color component of each of the first pixels, and using the luminance component of each of the first pixels as a luminance of each of the first pixels;

dividing the color saturation of each of the first pixels by the luminance to obtain a first saturation-luminance ratio value of each of the first pixels; and calculating the first pixel reference value of each of the first pixels by using the self-define mask and the first saturation-luminance ratio value of each of the first pixels.

2. The image fusion method of claim 1, further comprising:

performing a geometry calibration procedure on the first image or the second image to generate an offset-calibrated first image or an offset-calibrated second image.

3. The image fusion method of claim 1, further comprising:

performing a data format conversion procedure on the first image and the second image to convert the first image and the second image that belong to an original data format into the first image and the second image that belong to a YCbCr format.

4. The image fusion method of claim 1, wherein the step of calculating the first pixel reference value of each of the first pixels by using the self-define mask and the first saturation-luminance ratio value of each of the first pixels comprises:
   defining a target point among the first pixels and a plurality of reference points among the first pixels by using the self-define mask, wherein the target point is located at a center of the self-define mask, and the reference points are located on the self-define mask in a vertical direction, a horizontal direction and two diagonal directions; and
   calculating differences between the first saturation-luminance ratio value of the target point and the first saturation-luminance ratio values of the reference points one by one, and summing absolute values of the differences to obtain the first pixel reference value of the target point.

5. The image fusion method of claim 1, wherein the step of comparing the first pixel reference value of each of the first pixels with the second pixel reference value of each of the corresponding second pixels to obtain the synthesizing weights respectively associated with the pixel positions comprises:
   determining whether the first pixel reference value of each of the first pixels is greater than the second pixel reference value of each of the corresponding second pixels;
   if yes, setting the corresponding synthesizing weights corresponding to the pixel positions where the first pixel reference value is greater than the second pixel reference value to be a first fetch-point index; and
   if no, setting the corresponding synthesizing weights corresponding to the pixel positions where the first pixel reference value is not greater than the second pixel reference value to be a second fetch-point index.

6. The image fusion method of claim 5, wherein the step of obtaining the fusion image by synthesizing the first image and the second image according to the synthesizing reference map, the first pixels and the second pixels comprises:
   if the synthesizing weights on the synthesizing reference map are the first fetch-point index, fetching the first pixels corresponding to the first fetch-point index as pixel points on the fusion image; and
   if the synthesizing weights on the synthesizing reference map are the second fetch-point index, fetching the second pixels corresponding to the second fetch-point index as the pixel points on the fusion image.

7. The image fusion method of claim 5, further comprising:
   determining whether a difference between the first pixel reference value of each of the first pixels and the second pixel reference value of each of the corresponding second pixels is less than a threshold; and
   if yes, setting the corresponding synthesizing weights corresponding to the pixel positions where the difference between the first pixel reference value and the second pixel reference value is less than the threshold to be a third fetch-point index.

8. The image fusion method of claim 7, wherein the step of obtaining the fusion image by synthesizing the first image and the second image according to the synthesizing reference map, the first pixels and the second pixels comprises:
   if the synthesizing weights on the synthesizing reference map are the first fetch-point index, fetching the first pixels corresponding to the first fetch-point index as pixel points on the fusion image;
   if the synthesizing weights on the synthesizing reference map are the second fetch-point index, fetching the second pixels corresponding to the second fetch-point index as the pixel points on the fusion image; and
   if the synthesizing weights on the synthesizing reference map are the third fetch-point index, fetching average values of the first pixels and the second pixels both corresponding to the third fetch-point index to generate the pixel points on the fusion image.

9. The image fusion method of claim 1, wherein the first photographing parameter is a first focus length, the second photographing parameter is a second focus length, and the first focus length is different from the second focus length.

10. The image fusion method of claim 9, further comprising:
    calculating a focus difference between the first focus length and the second focus length length; and
    setting a size of the self-define mask according to the focus difference, wherein the size of the self-define mask becomes larger in response to increment of the focus difference, and the size of the self-define mask becomes smaller in response to decrement of the focus difference.

11. The image fusion method of claim 1, wherein the first photographing parameter is a first aperture value, the second photographing parameter is a second aperture value, and the first aperture value is different from the second aperture value.

12. An image processing apparatus, comprising:
    a memory; and
    a processor, coupled to the memory and configured for:
       obtaining a first image and a second image associated with the same scene, wherein the first image is generated based on a first photographing parameter, and the second image is generated based on a second photographing parameter;
       calculating a first pixel reference value of each of a plurality of first pixels by using a self-define mask according to color components and a luminance component of each of the first pixels on the first image, and calculating a second pixel reference value of each of a plurality of second pixels by using the self-define mask according to color components and a luminance component of each of the second pixels on the second image;
       comparing the first pixel reference value of each of the first pixels and the second pixel reference value of each of the corresponding second pixels to obtain a plurality of synthesizing weights respectively associated with a plurality of pixel positions, and recording the synthesizing weights respectively associated with the pixel positions into a synthesizing reference map; and
       obtaining a fusion image by synthesizing the first image and the second image according to the synthesizing reference map, the first pixels and the second pixels,
    wherein the processor calculates a color saturation of each of the first pixels by using a first color component and a second color component of each of the first pixels, and uses the luminance component of each of the first pixels as a luminance of each of the first pixels,
    wherein the processor divides the color saturation of each of the first pixels by the luminance to obtain a first saturation-luminance ratio value of each of the first pixels, wherein the processor calculates the first pixel reference value of each of the first pixels by using the self-define mask and the first saturation-luminance ratio value of each of the first pixels.

13. The image processing apparatus of claim 12, wherein the processor performs a geometry calibration procedure on the first image or the second image to generate an offset-calibrated first image or an offset-calibrated second image.

14. The image processing apparatus of claim 12, wherein the processor performs a data format conversion procedure on the first image and the second image to convert the first image and the second image that belong to an original data format into the first image and the second image that belong to a YCbCr format.

15. The image processing apparatus of claim 12, wherein the processor defines a target point among the first pixels and a plurality of reference points among the first pixels by using the self-define mask, wherein the target point is located at a center of the self-define mask, and the reference points are located on the self-define mask in a vertical direction, a horizontal direction and two diagonal directions, wherein the processor calculates differences between the first saturation-luminance ratio value of the target point and the first saturation-luminance ratio values of the reference points one by one, and sums absolute values of the differences to obtain the first pixel reference value of the target point.

16. The image processing apparatus of claim 12, wherein the processor determines whether the first pixel reference value of each of the first pixels is greater than the second pixel reference value of each of the corresponding second pixels; if yes, the processor sets the corresponding synthesizing weights to be a first fetch-point index; and if no, the processor sets the corresponding synthesizing weights to be a second fetch-point index.

17. The image processing apparatus of claim 16, wherein if the synthesizing weights on the synthesizing reference map are the first fetch-point index, the processor fetches the first pixels corresponding to the first fetch-point index as pixel points on the fusion image; and if the synthesizing weights on the synthesizing reference map are the second fetch-point index, the processor fetches the second pixels corresponding to the second fetch-point index as the pixel points on the fusion image.

18. The image processing apparatus of claim 16, wherein the processor determines whether a difference between the first pixel reference value of each of the first pixels and the second pixel reference value of each of the corresponding second pixel is less than a threshold; and if yes, the processor sets the corresponding synthesizing weights to be a third fetch-point index.

19. The image processing apparatus of claim 18, wherein if the synthesizing weights on the synthesizing reference map are the first fetch-point index, the processor fetches the first pixels corresponding to the first fetch-point index as pixel points on the fusion image;

if the synthesizing weights on the synthesizing reference map are the second fetch-point index, the processor fetches the second pixels corresponding to the second fetch-point index as the pixel points on the fusion image; and if the synthesizing weights on the synthesizing reference map are the third fetch-point index, the processor fetches average values of the first pixels and the second pixels corresponding to the third fetch-point index as the pixel points on the fusion image.

20. The image processing apparatus of claim 12, wherein the first photographing parameter is a first focus length, the second photographing parameter is a second focus length, and the first focus length is different from the second focus length.

21. The image processing apparatus of claim 20, wherein the processor calculates a focus difference between the first focus length and the second focus length, and sets a size of the self-define mask according to the focus difference, wherein the size of the self-define mask becomes larger in response to increment of the focus difference, and the size of the self-define mask becomes smaller in response to decrement of the focus difference.

22. The image processing apparatus of claim 12, wherein the first photographing parameter is a first aperture value, the second photographing parameter is a second aperture value, and the first aperture value is different from the second aperture value.

* * * * *